US012777101B1

(12) United States Patent
Kanevski et al.

(10) Patent No.: US 12,777,101 B1
(45) Date of Patent: Oct. 27, 2026

(54) REGULATING DATA REQUEST TRANSMISSION TO ONE OR MORE THIRD PARTY SYSTEMS ACROSS CLUSTERS OF SERVERS IN AN ONLINE SYSTEM

(71) Applicant: Mango Technologies, Inc., San Diego, CA (US)

(72) Inventors: Ivan Kanevski, Oakland, CA (US); Dmitry Koterov, Redwood City, CA (US); Taras Zubyk, London (GB); Oleg Serov, Toronto (CA); Elliot Pourmand, Berkeley, CA (US)

(73) Assignee: Mango Technologies, Inc., San Diego, CA (US)

( * ) Notice: Subject to any disclaimer, the term of this patent is extended or adjusted under 35 U.S.C. 154(b) by 0 days.

(21) Appl. No.: 19/087,215

(22) Filed: Mar. 21, 2025

Related U.S. Application Data

(60) Provisional application No. 63/664,655, filed on Jun. 26, 2024.

(51) Int. Cl.
*H04L 67/53* (2022.01)
*H04L 67/62* (2022.01)

(52) U.S. Cl.
CPC .............. *H04L 67/53* (2022.05); *H04L 67/62* (2022.05)

(58) Field of Classification Search
None
See application file for complete search history.

(56) References Cited

U.S. PATENT DOCUMENTS 7,386,547 B2 * 6/2008 Grasso .................... G06F 16/93
9,654,590 B2 * 5/2017 Kvernvik .............. H04M 15/41
9,830,468 B2 * 11/2017 Drewry ............... H04L 63/0435
9,860,229 B2 * 1/2018 Miles ....................... H04L 63/08
10,404,814 B1 * 9/2019 Saprykin ................. G06F 16/22
10,778,769 B2 * 9/2020 Zhang ...................... H04L 67/52
11,010,341 B2 * 5/2021 Chen ................... G06F 16/1824
11,218,854 B2 * 1/2022 Raleigh ................... H04W 4/50
12,206,806 B2 * 1/2025 Zhang ................. H04L 41/0894
2002/0108115 A1 * 8/2002 Palmer ............. H04N 21/23439 725/50
2012/0066034 A1 * 3/2012 Nolan .................... G06Q 40/02 705/14.1
2013/0103813 A1 * 4/2013 Kukreja .............. H04L 47/2458 709/223
2017/0200476 A1 * 7/2017 Chen ....................... G06F 16/13
2025/0390669 A1 * 12/2025 Rajagopalan ......... G06F 40/186
2026/0030567 A1 * 1/2026 Rajagopalan .... G06Q 10/06311
2026/0065205 A1 * 3/2026 Elendt ................ G06Q 10/0639

* cited by examiner

*Primary Examiner* — Backhean Tiv
(74) *Attorney, Agent, or Firm* — Brannon IP, PLLC; Brian G. Brannon

(57) ABSTRACT

An online system may access data objects stored by one or more third party systems for a user, allowing the user to access data objects maintained by one or more third party systems via the online system. Different third party systems regulate a number of or a frequency of requests from data objects received during time intervals, and the online system accounts for such regulations by scheduling transmissions of requests to a third party system for future times rather than when a data object is determined to be obtained. Additionally, the online system exponentially increases a delay time interval to wait for retransmission of a request for the data object in response to receiving indications from the third party system that a request for a data object is inconsistent with a regulation.

18 Claims, 5 Drawing Sheets

REGULATING DATA REQUEST TRANSMISSION TO ONE OR MORE THIRD PARTY SYSTEMS ACROSS CLUSTERS OF SERVERS IN AN ONLINE SYSTEM

CROSS REFERENCE TO RELATED APPLICATION

This application claims the benefit of U.S. Provisional Application No. 63/664,655, filed Jun. 26, 2024, which is incorporated by reference in its entirety.

BACKGROUND

Users often maintain data across multiple online systems and access different online systems to interact with different data. For example, different online systems are associated with different applications used to interact with data stored by various online systems. For example, a user accesses data maintained by a first online system through a first application associated with the first online system and accesses data maintained by a second online system through a second application associated with the second online system. Each online system maintaining data for a user maintains a user account for the user and stores data from the user, or otherwise associated with the user, in the user account for the user.

Maintaining data at different online systems allows a user to leverage specific functionality provided by different online systems for different data. For example, an online system provides data storage for a user, while a different online system facilitates creation or modification of stored data. While using multiple online systems to maintains data and to interact with data allows a user to take advantage of different functionality provided by different online systems, maintaining data across multiple online systems increases an amount of interaction with online systems for a user to subsequently retrieve data. As different online systems often store data in different formats or use different syntax structures for instructions to interact with data, maintaining data in different online systems increases an amount of complexity for the user to retrieve or to interact with data. Further, as a user may maintain a data object (e.g., a file) in different online systems, maintaining consistency between copies of the data object stored on different online systems often involves a user manually uploading a modified version of the data object to multiple online systems, increasing time and complexity for modifying a data object. Maintaining a copy of a data object on multiple online systems also increases an overall amount of storage resources used for storing the different copies of the data object on different online systems.

An online system may obtain data objects maintained by an additional online system to allow a user of the online system to access the data objects maintained by the additional online system via the online system. In various implementations, such an online system maintains a local copy of the data objects maintained by the additional online system and propagates modifications to a copy of the data object the additional online system to modify the data object. Similarly, the online system receives modifications to the data object received by additional online system and modifies the copy of the data object accordingly. In such configurations, the online system transmits requests for different data objects maintained by the additional online system to receive data objects from the additional online system. However, the additional online system often impose rate limiting restrictions on received requests for data object. Rate limiting restrictions may be based on a number of requests received from the online system or received from multiple online systems.

When an online system comprises a distributed system including multiple servers, multiple servers of the online system transmitting requests for data objects to an additional online system may cause the online system to rapidly reach a limit on requests for data objects imposed by an additional online system. Reaching the limit on requests for data objects may prevent the online system from receiving data objects from the additional online system for a specific amount of time, introducing latency in the online system accessing data objects maintained by the additional online system. As different online systems enforce different rate-limiting restrictions on requests for data objects, storing and applying multiple rate-limiting restrictions specific to different additional online systems is resource-intensive for an online system to maintain and to implement.

SUMMARY

In accordance with one or more aspects of the disclosure, an online system, such as a task management system, transmits requests for data objects to a third party system. The requests may be for the online system to maintain local copies of data objects maintained by the third party system or to obtain modifications to local copies of data objects from the third party system. However, the third party system enforces one or more regulations on receipt of requests for data objects. The one or more regulations limit a rate at which the third party system receives requests for data objects received from various sources, such as the online system to prevent overloading of resources of the third party systems and allow the third party system to distribute resources across various users accessing data objects maintained by the third party system to optimize data object retrieval time for various users.

In various embodiments, the third party system transmits the one or more regulations on receipt of requests for data objects to the online system. Receiving the one or more regulations on receipt of requests for data objects allows the online system to schedule transmission of requests for data objects to the third party system. One or more regulations on receipt of requests for data objects may be global regulations based on requests from multiple users or may be user-specific based on requests received from a specific user. The third party system may enforce global regulations on receipt of requests for data object that account for requests received from multiple users as well as user-specific regulations on receipt of requests for data objects from a specific user in various embodiments.

If a received request for a data object from the online system is not consistent with one or more regulations on receipt of requests for data objects, the third party system does not transmit the data object identified by the request. This prevents the third party system from expending resources in obtaining and transmitting the data object, enabling the third party system to optimize data object retrieval times for various entities form which requests for data objects were received. The third party system transmits an indication to the online system that the request from the online system is not consistent with a regulation enforced by the third party system. To obtain the data object, the online system subsequently retransmits the request for the data object to the third party system at a later time.

Based on the one or more regulations on receipt of requests for data objects, the online system schedules transmission of requests for data objects to the third party system. For example, the third party system imposes a limit on a number of requests for data objects received during a time interval to no more than a threshold number of requests within a time interval. As an example, the third party system specifies a threshold number of requests for data objects received during an hour. The third party system transmits the threshold number of requests and the time interval for the threshold number of requests to the online system to allow the online system to schedule transmission of requests for data objects.

To reduce a likelihood of retransmitting a request for a data object from the online system to the third party system, when the online system determines to obtain a data object from the third party system, the online system determines a request time for transmitting the request for the data object to the online system. The data object is associated with a user of the third party system who has authorized the online system to access data objects the third party system maintains for the user. For example, the online system determines to obtain a data object from the third party system in response to receiving an input from the user to access the data object. As another example, the online system determines to obtain the data object from the third party system in response to one or more criteria being satisfied (e.g., a threshold amount of time elapsing from transmission of a prior request for a data object, receiving an indication from the third party system that a data object maintained by the third party system has been modified). The request time is later than a time when the online system determined to obtain the data object, so the online system schedules transmission of the request for the data object to the third party system at a time in the future, rather than transmitting the request when the online system determines to obtain the data object from the third party system.

When determining the request time for transmitting the request for the data object to the third party system, the online system accounts for one or more of the regulations on receipt of requests for data objects enforced by the third party system and prior requests for data objects previously transmitted to the third party system by the online system. In various embodiments, the online system determines a prior number of requests for data objects previously transmitted to the third party system during a specific time interval and evaluates the prior number of requests for data objects against one or more regulations on receipt of requests for data objects. For example, a regulation enforced by the third party system specifies a threshold number of requests for data objects received during a time interval, and the online system determines whether a number of prior requests for data objects transmitted to the third party system is less than the threshold for the time interval. In response to the number of additional requests for data objects for the online system to transmit and the received request not exceeding the threshold at the request time, the online system determines the request time as a time within the time interval However, in response to determining the number of additional requests for data objects and the received request exceeds the threshold, the online system determines the request time for a time later than the time interval.

At the request time, the online system transmits the request for the data object to the third party system via a network. In response to the third party system determining the request for the data object is not consistent with at least one regulation on receipt of requests for data objects, the third party system transmits an indication to the online system that the request is inconsistent with at least one regulation on receipt on requests for data objects. For example, the third party system transmits the indication to the online system in response to the third party system receiving greater than a threshold number of requests in a specific time interval that includes the request time. As another example, the third party system transmits the indication to the online system in response to the third party system receiving greater than a threshold number of requests for data objects associated with authentication information for the user in a specific time interval that includes the request time. In other embodiments, the third party system transmits the indication in response to determining that the request for the data object is not consistent with one or more other regulations enforced by the third party system. The request not being consistent with at least one regulation enforced by the third party system indicates the third party system received greater than a threshold number of requests in a time interval, which impairs performance of the third party system.

In response to receiving the indication, the online system determines a delay time interval for retransmitting the request for the data object to the third party system. The delay time interval exponentially increases based on a number of indications that the request was inconsistent with one or more regulations the third party system enforces that the online system received from the third party system. For example, the online system determines an exponent for a base value for determining the delay time interval based on a number of indications that requests from the online system for data objects were inconsistent with one or more regulations on receipt of requests for data objects enforced by the third party system the online system received from the third party system. The online system raises the base value to the determined exponent to determine the delay time interval and multiplies a time interval by the base value raised to the determined exponent. Hence, the online system multiplies a time interval by a coefficient comprising the base value raised to the determined exponent to determine the delay time interval. The time interval may be a predefined value maintained by the online system in some embodiments. Further, the online system may maintain different time intervals for different third party systems in some embodiments. Hence, as a number of indications the online system 400 receives from the third party system increases, the delay time interval for retransmitting the request exponentially increases to increase an amount of time before retransmission.

After waiting the determined delay time interval from receipt of the indication, the online system subsequently retransmits the request for the data object to the third party system. In response to the retransmitted request for the data object being consistent with the regulations on receipt of requests for data objects enforced by the third party system, the third party system transmits the data object to the online system via the network. However, in response to the third party system determining the retransmitted request for the data object does is not consistent with at least one regulation on receipt of requests for data objects, the third party system transmits an additional indication to the online system 400 that the retransmitted request is inconsistent with at least one regulation on receipt on requests for data objects, as further described above.

Determining the delay time interval as an exponentially increasing value based on a number of indications received from the third party system allows the online system to iteratively increase the delay time interval between successive retransmissions of the request. As different third party systems often maintain different regulations on receipt of requests for data object, dynamically modifying the delay interval for retransmitting a request for the data object in response to an indication received from the third party system in response to a request allows the online system to accommodate different regulations on receipt of requests for data objects without maintaining and applying multiple different methods for determining delay intervals for retransmitting requests for data objects for different third party systems. This reduces computational resources used by the online system 400 to schedule retransmission of a request for a data object by providing a consistent process for determining a delay time interval for retransmitting requests for data objects suitable for use with various third party systems.

DETAILED DESCRIPTION

Figure 1:
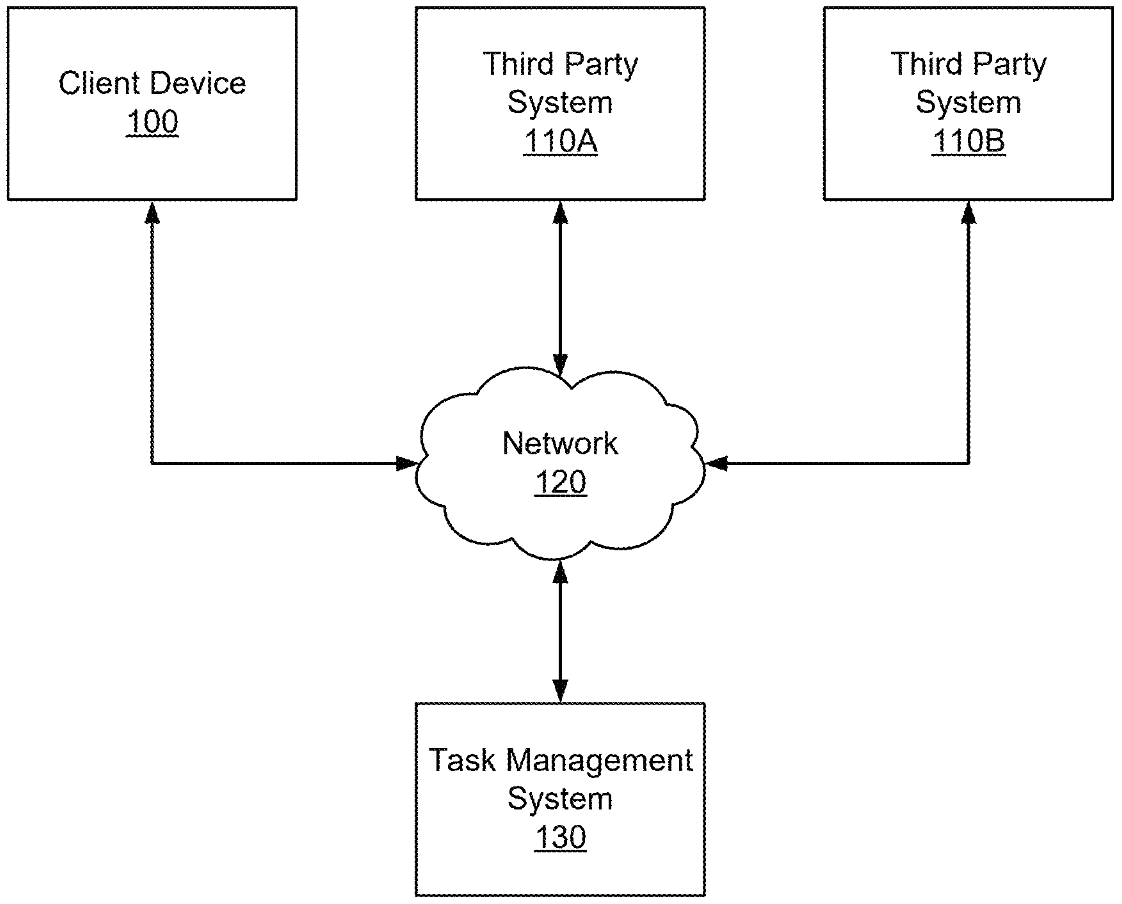
FIG. 1 illustrates an example system environment for a task management system, in accordance with one or more embodiments.

FIG. 1 illustrates an example system environment for a task management system 130, in accordance with one or more embodiments. The system environment illustrated in FIG. 1 includes a customer client device 100, one or more third party systems 110A, 110B (also referred to individually and collectively using reference number 110), a network 120, and a task management system 130. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

While FIG. 1 shows a single client device 100 for purposes of illustration, any number of client devices 100 may be included in the system environment. As such, there may be more than one client device 100 in various embodiments. The client device 100 is a device through which a user may interact with one or more third party systems 110 or with the task management system 130. The client device 100 can be a personal or mobile computing device, such as a smartphone, a tablet, a laptop computer, or desktop computer. In some embodiments, the customer client device 100 executes a task management application that uses an application programming interface (API) to communicate with the task management system 130.

Through interaction with the client device 100, a user creates one or more tasks stored by the task management system 130 via the task management application, with each task corresponding to one or more actions to be performed and a performing user to perform the one or more actions. The performing user may be the user who created the task or may be a different user. Additionally, the user may specify one or more attributes of a task. Example attributes of a task include a status of the task, a due date for the task, a priority level of the task, a resource allocation (e.g., a budget) for performing the task, one or more comments about the task, or other information relevant to performing an action corresponding to the task.

In various embodiments, the task management application executing on the client device 100 presents a workflow management interface to the user. The workflow management interface is a user interface that receives input from the user to identify or create tasks, generate a list of related tasks, generate a hierarchy of tasks, associate a task with a performing user, modify one or more attributes of a task, or perform other interactions affecting one or more tasks. In various embodiments, the workflow management interface allows the user to search for tasks satisfying one or more attributes that are identified by task management system 130 and accessible to the user. Additionally, the workflow management interface includes one or more messaging elements allowing the user to provide messages for transmission to one or more receiving users of the task management system 130.

The client device 100 may receive additional content from the task management system 130 to present to a customer. For example, the client device 100 may receive one or more messages for presentation to the user. As another example, the client device receives notifications from the task management system 130 and presents the notifications to the customer. A notification may indicate a change to an attribute of a task associated with the user (e.g., a change in a status of the task).

In some embodiments, the task management application also generates and presents a communication interface to the user that allows the customer to communicate messages to the task management system 130, to a receiving user of the task management system 130, or to a third party system 110. A message may include text data, audio data, image data, video data, or any combination thereof. For example, a message is a text message or a chat message. The client device 100 transmits a message via the network 120 and may receive one or more message via the network 120. In some embodiments, the communication interface may allow the user of the client device 100 and another user to communicate through audio or video communications, such as a phone call, a voice-over-Internet-Protocol call, or a video call.

A third party system 110 is a computing system separate from the task management system 130 that interacts with the task management system 130 or with the client device 100. In various embodiments, different third party systems 110A, 110B provide different types of content to the task management system 130 or to the client device 100. For example, a third party system 110 is an application provider communicating information describing one or more applications for execution by a client device 100 or communicating data to a client device 100 for use by an application executing on the client device 100. In other embodiments, a third party system 110 provides content or other information for presentation via a client device 100. A third party system 110 may also communicate information to the task management system 130, such as files, documents, metadata, or other information to the task management system 130.

The customer client device 100, the one or more third party systems 110, and the task management system 130 can communicate with each other via the network 120. The network 120 is a collection of computing devices that communicate via wired or wireless connections. The network 120 may include one or more local area networks (LANs) or one or more wide area networks (WANs). The network 120, as referred to herein, is an inclusive term that may refer to any or all of standard layers used to describe a physical or virtual network, such as the physical layer, the data link layer, the network layer, the transport layer, the session layer, the presentation layer, and the application layer. The network 120 may include physical media for communicating data from one computing device to another computing device, such as MPLS lines, fiber optic cables, cellular connections (e.g., 3G, 4G, or 5G spectra), or satellites. The network 120 also may use networking protocols, such as TCP/IP, HTTP, SSH, SMS, or FTP, to transmit data between computing devices. In some embodiments, the network 120 may include BLUETOOTH® or near-field communication (NFC) technologies or protocols for local communications between computing devices. The network 120 may transmit encrypted or unencrypted data.

The task management system 130 is an online system by which users identify tasks specifying actions to be performed, identify a performing user to perform an action identified by a task, and specify attributes of the task. The task management system 130 maintains associations between users and tasks. For example, the task management system 130 stores an association between a task identifier of a task and one or more user identifiers of users, such as a user who identified the task and one or more performing users associated with the task. The task management system 130 receives modifications to one or more attributes of a task from a user associated with the task, and updates the attributes of the task based on the received modifications. Additionally or alternatively, the task management system 130 may modify one or more attributes of a task based on information describing actions performed by a user. The task management system 130 transmits a notification to a client device 100 of a user associated with a task in response to an attribute of the task being modified, allowing a user associated with the task to remain informed of changes to one or more attributes of the task.

In various embodiments, the task management system 130 is a distributed system including multiple servers that communicate with each other via the network 120. Servers of the task management system 130 may be in different locations. For example, the task management system 130 includes servers in different geographic locations. When accessing the task management system 130, different client devices 100 may access different servers, or a client device 100 may access different servers when accessing the task management system 130 at different times. Further, different servers of the task management system 130 may perform different functions for the task management system 130.

Additionally, the task management system 130 may generate one or more interfaces for a user associated with one or more tasks. For example, an interface identifies tasks associated with a user and identifies at least a set of attributes of the tasks, allowing the user to readily review and identify attributes of different tasks. The interface may identify relationships between tasks or between tasks and one or more sub-tasks of a task identified by a user, allowing a user to visualize relationships between different tasks. Further, the task management system 130 may store files or other data associated with a task or store information from retrieving files or data associated with the task from a third party system 110 to simplify access to data for reviewing or for performing a task for a user. The task management system 130 is described in further detail below with regard to FIG. 2.

Figure 2:
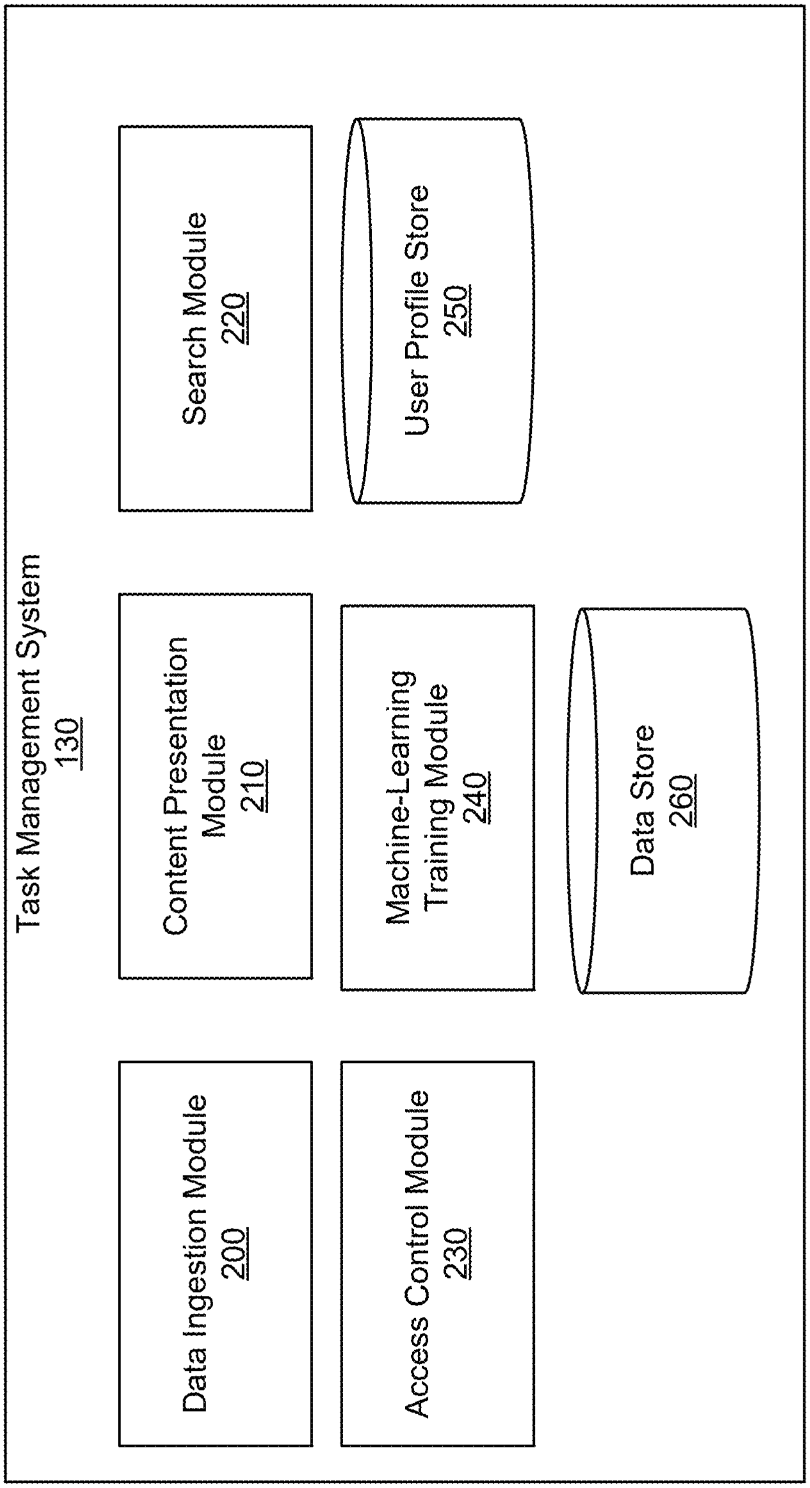
FIG. 2 illustrates an example system architecture for a task management system, in accordance with one or more embodiments.

FIG. 2 illustrates an example system architecture for a task management system 130, in accordance with some embodiments. The system architecture illustrated in FIG. 2 includes a data ingestion module 200, a content presentation module 210, a search module 220, an access control module 230, a machine learning training module 240, a user profile store 250, and a data store 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data ingestion module 200 collects data used by the task management system 130 and stores the data in the user profile store. For example, the data ingestion module 200 receives information from a user creating a task, including one or more attributes of a task, or instructions for modifying one or more attributes of a task. Additionally, the data ingestion module 200 receives information from a user including characteristics of a user for inclusion in a corresponding user profile. The data ingestion module 200 may encrypt some or all of the obtained data, such as certain data describing a user.

The data ingestion module 200 also receives data describing relationships between tasks. For example, a user may identify one or more discrete sub-tasks that correspond to different portions of a task. Further, the data ingestion module 200 may receive data describing a hierarchy of tasks. For example, the data ingestion module 200 receives an identifier of a list from a user along with identifiers of one or more tasks to associate with the list. Hence, the list includes one or more tasks, allowing a user to organize related tasks, tasks related to a common objective, or tasks having one or more other common criteria. Additionally hierarchical information may be specified in some embodiments. For example, the data ingestion module 200 receives an identifier of a category and identifiers of one or more lists associated with the category, allowing a user to generate a grouping of lists, and the tasks included in the lists. As further described below, the data ingestion module 200 stores information describing relationships between tasks in the data store 260.

Additionally, the data ingestion module 200 captures interactions by users with tasks and stores the interactions in an interaction log included in the data store 260. In various embodiments, when a user interacts with a task through the task management system 130, the data ingestion module 200 determines an identifier of the user, an identifier of the task with which the user interacted, a time when the interaction occurred, and a description of the interaction by the user with the task. When the interaction with a task modifies an attribute of the task, the description of the interaction by the user includes an identifier of the attribute of the modifier of the task and a modified value of the task. In some embodiments, the description of the interaction includes an indication that the interaction changed at least one attribute of the task. Capturing interactions by users with tasks allows the data ingestion module 200 to generate an interaction log in the data store 260 that may be used to subsequently identify modifications to attributes of a task or a history of how one or more users interacted with a task. This may be leveraged to generate a record of how one or more users interacted with one or more tasks over time.

The content presentation module 210 selects content for presentation to a user and generates one or more interfaces for displaying the content to the user. In various embodiments, the content presentation module 210 receives a request for content from the user including one or more criteria, selects one or more tasks having characteristics satisfying one or more of the criteria, and generates an interface displaying information about the selected one or more tasks to a user. The content presentation module 210 generates instructions for transmission to a client device 100, which executes the instructions to generate an interface presenting the information about the selected one or more tasks. In various embodiments, the request from the user includes display instructions specifying how an interface presents information about the selected one or more tasks. For example, a request specifies a calendar view, so the content presentation module 210 generates an interface displaying information about one or more tasks on a calendar, with the calendar displaying information identifying a task, and one or more characteristics of the task, in a portion of the calendar corresponding to a date associated with the task. As another example, a request includes a specific attribute of a task, and the content presentation module 210 selects tasks having the specific attribute and generates instructions for an interface presenting the selected tasks.

The search module 220 receives a search query from the client device 100 and retrieves search results comprising tasks, or other data object, with attributes at least partially satisfying the search query. Data objects may be documents, video files, audio files, or other files accessible to the search module 220. A search query is text for a word or set of words that indicate attributes of a task or another data object. In various embodiments, the search module 220 generates a score for each task, or other data object, at least partially satisfying the search query and presents the search results based on their corresponding scores. For example, the search module 220 scores tasks or other data objects based on a measure of relevance of a task or a data object to a search query. For example, the search module 220 applies natural language processing (NLP) techniques to text in the search query to generate a search query embedding representing characteristics of the search query. The search module 220 may use the search query embedding to score candidate items for presentation to a customer (e.g., by comparing a search query embedding to an item embedding).

In some embodiments, a user authorizes the task management system 130 to access information associated with the user and stored by a third party system 110. In various embodiments, the search module 220 stores authentication information for the third party system 110 corresponding to the user in association with an identifier of the user and an identifier of the third party system 110. The authentication information for the third party system 110 may be a combination of a username and password or other authentication information for the user to access the third party system 110. In various embodiments, when the task management system 130 receives a search query from the user, the task management system, through one or more application programming interfaces (APIs), the search module 220 transmits the search query to the third party system 110 and retrieves files or other content items from the third party system 110 that at least partially satisfy the search query. This allows the search module 220 to evaluate both locally stored data in the data store 260 and data maintained by a third party system 110 for the user for search results, allowing the search module 220 to provide search results accounting for data associated with the user from one or more third party systems 110 that the user authorized the task management system 130 to access.

To simplify access to data maintained by a third party system 110 for a user, the search module 220 obtains and stores authentication information for the user to access the third party system 110. The search module 220 stores authentication information for a third party system 110 is associated with the third party system 110 and a user. Examples of authentication information include: a token, a cookie, a combination of a username and a password, or other information capable of uniquely identifying the user to the third party system 110. The search module 220 transmits the authentication information to the third party system 110 to establish a connection between the third party system 110 and the search module 220 for the user. Establishing the connection with the third party system 110 using authentication information specific to the user limits the search module 220 to accessing information maintained by the third party system 110 that the user is capable of accessing in response to a search query received from the specific user. This allows the search module 220 to access data stored by the third party system 110 that the user is capable of accessing (e.g., data stored for the user, data that another user has authorized the user to access, etc.), while allowing the third party system 110 to prevent the search module 220 from accessing other data that the user is not capable of accessing.

In some embodiments, a user specifies a type of connection between the search module 220 and a third party system 110 for accessing data maintained by the third party system 110 for the user. Alternatively, the third party system 110 specifies the type of connection between the third party system 110 and the search module 220. The type of connection is stored by the search module 220 in association with the authentication information for the third party system 110 for the user. For example, a type of connection is private, where data obtained from the third party system 110 by the search module 220 via the connection is limited to being presented to the user. Another type of connection is public, where data obtained from the third party system 110 by the search module 220 via the connection may be presented to the user and to one or more additional users. In some embodiments, the additional users may be specified by the user through one or more parameters provided to the search module 220 or to the third party system 110.

In various embodiments, the search module 220 stores a connection status in association with authentication information associated with a user and a third party system 110. The connection status provides an indication of a capability the search module 220 to exchange data with the third party system 110 via the connection. The connection status may be received from the third party system 110 in various embodiments. As some third party systems 110 request periodic refreshing of authentication information for the user, the search module 220 may retransmit authentication information associated with the user to the third party system 110 in response to receiving a specific connection status or prompt the user to provide authentication information to the third party system 110 in response to receiving a specific connection status. Similarly, the user's authorization to access the third party system 110 may change over time or authorization to perform different interactions with data through the third party system 110 may change over time, and a connection status from the third party system 110 may indicate a change in the user's authorization to access the third party system 110. Additionally, a connection status may indicate that the task management system 130 is indexing data stored by the third party system 110 and accessible to the user or is generating a representation of data stored by the third party system 110 and accessible to the user. As other examples, a connection status indicates that the search module 220 is ready to exchange data with the third party system 110 via the connection or is not ready to exchange data with the third party system 110 via the connection.

In various embodiments, a third party system 110 is associated with an application executing on a client device 100 through which a user interacts with data maintained by the third party system 110 and accessible to the user. The search module 220 may leverage the application associated with the third party system 110 to establish the connection for exchanging data with the third party system 110. In various embodiments, the search module 220 stores authentication for the user in association with an application, as further described above. The search module uses the authentication information associated with the user to establish the connection with the third party system 110 using the authentication information for the user for the application. Additionally, the search module 220 stores a type of the connection with the third party system 110 via application (e.g., private or public, as further described above) and a connection status of the connection, as further described above. The search module 220 may store authentication information for the user for different applications associated with a third party system 110, allowing the search module 220 to leverage different applications for establishing a connection with a third party system 110 or with different third party systems 110.

An application may provide different features that correspond to interactions the user is capable of performing via the application with data maintained by the third party system 110 accessible to the user. Different features may correspond to one or more different interactions in various embodiments. Example interactions include: creating a data object, modifying a data object, accessing a data object, deleting a data object, modifying one or more specific fields of a data object, or other interactions modifying data stored by the third party system 110. One or more features of an application may be optional, allowing the user to enable or to disable an optional features to increase or to decrease, respectively, interactions the user may perform with data maintained by the third party system 110 and accessible to the user. In some embodiments, a set of features may be concrete, with the user unable to disable a concrete feature. Different features may be associated with one or more permissions, limiting use of a feature to a user to whom the third party system 110 has granted the one or more permissions. Permissions granted to the user by the third party system 110 are stored in association with the authentication information of the user for the third party system 110, which limits the search module 220 to performing interactions with data stored by the third party system 110 and accessible to the user to interactions corresponding to the permissions granted to the user by the third party system 110.

After storing authentication information for a user to access a third party system 110 and establishing a connection between the search module 220 and the third party system 110, the search module 220 indexes data stored by the third party system 110 and accessible to the user. When indexing data from the third party system 110, the search module 220 generates a graph for the third party system 110 (or for an application) and for the user that defines relationships between data objects maintained by the third party system 110 that are accessible to the user. For example, the graph generated for a third party system 110 and a user identifies parent-child relationships between different types of data objects maintained by the third party system 110, with edges connecting different data objects having a relationship in the third party system 110. An edge connecting data objects in the graph includes relationship information between the connected data objects in various embodiments, allowing the graph maintained by search module 220 to locally specify relationships between data objects maintained by the third party system 110. As an example, the search module 220 determines the third party system 110 maintains data objects that are folders and that data objects comprising files are included in a folder. The hierarchical relationship between folders and files in the previous example is described by relationship information included in an edge connecting a file to a folder in the graph for the third party system 110 and the user generated by the search module 220. Further, a connection between data objects in a graph generated for the third party system 110 and the user include one or more permissions identifying users of the third party system 110 authorized to access a data object or identifying one or more interactions that the user is authorized to perform via the third party system 110 with a data object. The graph generated by the search module 220 provides a representation of the data maintained by the third party system 110 that is locally accessible to the search module 220. The search module 220 generates a graph for different combinations of users and third party systems 110.

Indexing the data stored by the third party system 110 and accessible to the user enables the search module 220 to subsequently compare data stored by the third party system 110 and accessible to the user to a search query received from the user. In various embodiments, the search module 220 and the third party system 110 exchange data stored by the third party system 110 and accessible to the user through a representational state transfer (REST) framework, where data objects are identified in requests between the search module 220 and the third party system 110 via the connection as universal resource indicators (URIs). In some embodiments, the search module 220 normalizes data objects received from a third party system 110 into a common representation comprising a format or a schema, simplifying subsequent retrieval of the data objects. The search module 220 may store criteria or instructions for converting data objects into the common representation. Alternatively or additionally, the search module 220 stores a trained model that maps a storage schema used by a third party system 110 to a common representation maintained by the task management system 130.

Indexing data stored by the third party system 110 and accessible to the user enables the search module 220 to determine a structure with which the third party system 110 stores data objects, as well as content of the data objects that are ingested. Determining the structure with which the third party system 110 stores data objects identifies fields of a data object and types corresponding to identified fields (e.g., text, number, person, etc.), as well as relationships between different data objects. In various embodiments, the search module 220 receives a URI of a data object from the third party system 110 and identifies fields and corresponding types for the data object from the URI. Determining the structure with which the third party system 110 storage data objects allows the search module 220 to generate a representation of data stored by the third party system that the search module 220 subsequently leverages to: create data objects for storage by the third party system 110, read data objects stored by the third party system 110, update (e.g., edit) data objects stored by the third party system 110, or delete data objects stored by the third party system 110. When indexing data from the third party system 110, the search module 220 regulates a rate at which instruction calls or other messages are transmitted between the search module 220 and the third party system 110 based on the third party system 110, preventing rate limit errors and regulating throughput of data between the third party system 110 and the search module 220. Hence, the search module allows the user to access or to modify a data object stored by the third party system 110 for the user by interacting with the task management system 130.

In various embodiments, the search module 220 schedules transmission of requests to a third party system 110 to minimize a probability of retransmitting the requests. For example, a third party system 110 enforces one or more regulations on requests for data objects to regulate a number of requests the third party system 110 fulfills during a time interval. When a request from the search module 220 is not consistent with a regulation enforced by the third party system 110, the third party system 110 transmits an indication to the search module 220, which retransmits the request at a later time in response to the indication. As further described below in conjunction with FIG. 4, the search module 220 minimizes a probability of retransmitting a request by determining a request time for transmitting a request to a third party system 110 based on prior requests transmitted to the third party system 110 and one or more regulations on requests for data objects enforced by the third party system 110. Additionally, in response to receiving an indication the request was not consistent with one or more regulations enforced by the third party system 110, the search module determines a delay time interval to wait before retransmitting the request. As further described below in conjunction with FIG. 4, the search module exponentially increases the delay time interval in response to a number of indications the search module 220 previously received from the third party system 110, such as in response to prior transmission of the request.

The search module 220 stores data indexed from a third party system 110 for a user in a horizontally scalable database that stores the data as a graph, as further described above. In some embodiments, the database storing the data ingested from the third party system 110 is included in the data store 260, while in other embodiments the database storing the data indexed from the third party system 110 is included in one or more computing devices or storage devices coupled to the task management system 130, allowing an amount of storage to be increased by coupling additional computing devices or additional storage devices coupled to the task management system 130. In various embodiments, data stored to the database by the search module 220 is automatically synchronized using a database to search engine bridge. The database to search engine bridge may synchronize data maintained by the third party system 110 and accessible to the user stored in the database in real-time or near real-time in various embodiments. Additionally, in various embodiments, the search module 220 accesses data in the database through a data access layer that enforces privacy settings for data stored in the database to limit access to data indexed from a third party system 110 into the database. The data access layer also maintains a graph-like structure that further reduces an amount of time to read data from the database or to store data to the database.

After indexing and initial storage in the database, the search module 220 receives an event stream from the third party system 110, where the third party system 110 transmits information describing modification to one or more data objects maintained by the third party system 110 and accessible to the user in response to one or more interactions being performed with the one or more data objects via the third party system 110. For example, webhooks corresponding to different interactions transmit information describing interactions by data objects via the third party system 110 to the task management system 130 when the interactions occur. The search module 220 may alternatively or additionally poll the third party system 110 for interactions with one or more data objects, implement a cursor based application programming interface (API) for obtaining information about interactions with data objects via the third party system 110, or use other communication methods to obtain data describing interactions with data objects via the third party system 110. The search module 220 updates the representation of the data objects maintained by the third party system 110 based on the interactions with data objects received from the third party system 110.

In various embodiments, the search module 220 exchanges data with a third party system 110 using an application programming interface (API) having graph-like semantics for instructions. For example, the search module 220 and the third party system 110 use GraphQL as a query language for an API exchanging data between the search module 220 and the third party system 110 over the connection. As the search module 220 stores data from a third party system 110 in a graph structure, the search module 220 leverages similarities in semantics and structure between the graph-like API query language and graph representation of data stored by the third party system 110 and accessible to the user to more efficiently retrieve data stored by the third party system 110 and accessible the user or to modify data stored by the third party system and accessible to the user. This allows the user to leverage the search module 220 to interact with data objects stored by the third party system 110 as if the data objects were locally stored on a client device 100 or on the task management system 130. Further, the graph-based query language and graph representation of data stored by one or more third party systems 110 for the user allows the search module 220 to provide one or more features that are implemented in a common manner when accessing data objects maintained by different third party systems 110. For example, the search module 220 receives instructions or interactions in a first format used by the task management system 130 and converts the received instructions or interactions into an alternative format used by the third party system 110.

Further, indexing data stored by a third party system 110 for the user, as further described above, allows the user to search and retrieve data objects from the third party system 110 through search queries or commands received by the search module 220. The search module 220 may apply an intent detection model, such as an intent detection model based on a generative model, such as large language model (LLM), to determine an intent for a received search query. Based on the intent determined for a search query, the search module 220 determines a structured language query for the search query, and may determine one or more databases or other sources of data to which the structured language query is applied to retrieve data objects satisfying, or partially satisfying, the search query.

The access control module 230 regulates access to tasks by various users. When a user accesses the task management system 130, the access control module 230 retrieves a user profile of the user from the user profile store 250. Based on one or more permissions in the user profile, the access control module 230 identifies a subset of tasks from the data store 260 for the user based on the one or more permissions. For example, the access control module 230 identifies a subset of tasks that one or more permissions of the user authorize the user to access. Tasks in the subset may be presented to the user or be otherwise accessible to the user, while tasks in the data store 260 and not in the subset are inaccessible to the user. Hence, the access control module 230 to regulate access to stored tasks for different users, Similarly, for a task, the access control module 230 determines a set of interactions a user is authorized to perform with the task based on one or more permissions in the user profile of the user. For example, a user with a first type of permission is authorized to modify one or more attributes of a task, while another user with a different type of permission is authorized to view the attributes of the task but is unable to modify one or more attributes of the task. As another example, one or more permissions of the user authorize the user to modify a set of attributes of the task, while preventing the user from modifying attributes that are not included in the set. The access control module 230 may receive permissions or modifications to permissions of a user from the user or from another user and store the permissions or the modified permissions in a user profile corresponding to the user. This allows the access control module 230 to regulate types of interactions with a task based on permissions of a user, enabling different users to perform different types of interactions with different tasks.

The machine learning training module 240 trains machine learning models used by the task management system 130. The task management system 130 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 240 generates the set of parameters for a machine learning model by "training" the machine learning model. Once trained, the machine learning model uses the set of parameters to transform inputs into outputs.

The machine learning training module 240 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 240 may apply an iterative process to train a machine learning model whereby the machine learning training module 240 trains the machine learning model on each of the set of training examples. To train a machine learning model based on a training example, the machine learning training module 240 applies the machine learning model to the input data in the training example to generate an output. The machine learning training module 240 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 240 updates the set of parameters for the machine learning model based on the score generated by the loss function. For example, the machine learning training module 240 may apply gradient descent to update the set of parameters.

In various embodiments, the machine learning training module 240 tunes one or more generative models that receive a text prompt and generate content based on the text prompt. A generative model is a large language model (LLM), such as a generative pre-trained transformer model (GPT) in various embodiments. The generative model may generate text in response to a text prompt in various embodiments. Alternatively or additionally, the generative model selects or generates an image in response to a text prompt. A generative model is model pre-trained on a text corpus including text to output text in response to a text prompt from a user. As another example, a generative model is a generative image model pre-rained on a corpus of images to output an image in response to a received text prompt. Obtaining a pre-trained generative model allows the machine learning training module 240 to leverage relationships between different text (or images) the generative model learned through application to a text corpus or image corpus including a larger amount of data and more varied data than the task management system 130 maintains.

In various embodiments, the machine learning training module 240 generates examples for inclusion in a prompt input to a generative model. An example includes an input to the generative model and an expected output in response to the input. For example, an example includes input text and output text along with formatting instructions for the output text. When applying a generative model to input, the task management system 130 (e.g., the content presentation module 210) generates a prompt for the generative model that includes the input and one or more examples generated by the machine learning training module 240. This allows the example included in the prompt to specify a format or content of the output of the generative model based on the input. In some embodiments, the machine learning training module 240 generates a GPT index including embeddings corresponding to example to facilitate identification and retrieval of one or more supplemental examples based on an embedding of an input to a generative model. The machine learning training module 240 stores the GPT index including the supplemental examples, or the embeddings for the supplemental examples in various embodiments.

The user profile store 250 includes a user profile corresponding to each user of the task management system 130. A user profile of a user includes a user identifier of a corresponding user, characteristics of the user, contact information for the user, or other descriptive information about the user. In various embodiments, the user profile of the user includes task identifiers of tasks associated with the user. Further, in some embodiments, the user profile of the user includes one or more permissions of the user. One or more permissions included in the user profile of a user identify types of interactions the user is permitted to perform with one or more tasks. Different permissions may correspond to different tasks, allowing the user to perform different types of interactions with different tasks. A user profile may also maintain references to interactions by the corresponding user performed on one or more tasks and stored in an interaction log in the data store 260. This allows the user to review or to identify one or more interactions the user previously performed with tasks.

The data store 260 stores data used by the task management system 130. For example, the data store 260 stores tasks created by a user. In various embodiments, the data store 260 includes a task log that includes a task identifier for each task with corresponding attributes of a task associated with the task identifier. For example, the task log includes a task identifier for a task with attributes of the task associated with the task identifier. As further described above, example attributes of the task include: an identifier of a user to perform the task, a status of the task, a due date for the task, a priority level of the task, a resource allocation (e.g., a budget) for performing the task, one or more comments about the task, or other information relevant to performing an action corresponding to the task.

Additionally, the data store 260 stores an interaction log describing interactions by users with the task management system 130. The interaction log includes entries including a task identifier, a user identifier of a user who performed an interaction, a time when the interaction was performed, and a description of the interaction. The description of the interaction may be a type of the interaction and may include data received through the interaction. For example, an interaction is a comment on a task, and a description of the interaction includes a type indicating a comment and text data comprising the comment. In various embodiments, the interaction log organizes entries chronologically, while in other embodiments, the interaction log may organize entries using other formats.

The data store 260 also stores trained machine learning models trained by the machine learning training module 240. For example, the data store 260 may store the set of parameters for a trained machine learning model on one or more non-transitory, computer-readable media. As another example, the data store 260 stores parameters comprising a previously trained model that the machine learning training module 240 obtained from a third party system 110 or from another source. For example, the data store 260 includes a generative model, such as a large language model (LLM) that the machine learning training module 240 obtained from a third party system 110. The data store 260 may also include one or more examples that a machine learning model, such as a generative model receives as input. The data store 260 uses computer-readable media to store data, and may use databases to organize the stored data.

Figure 3:
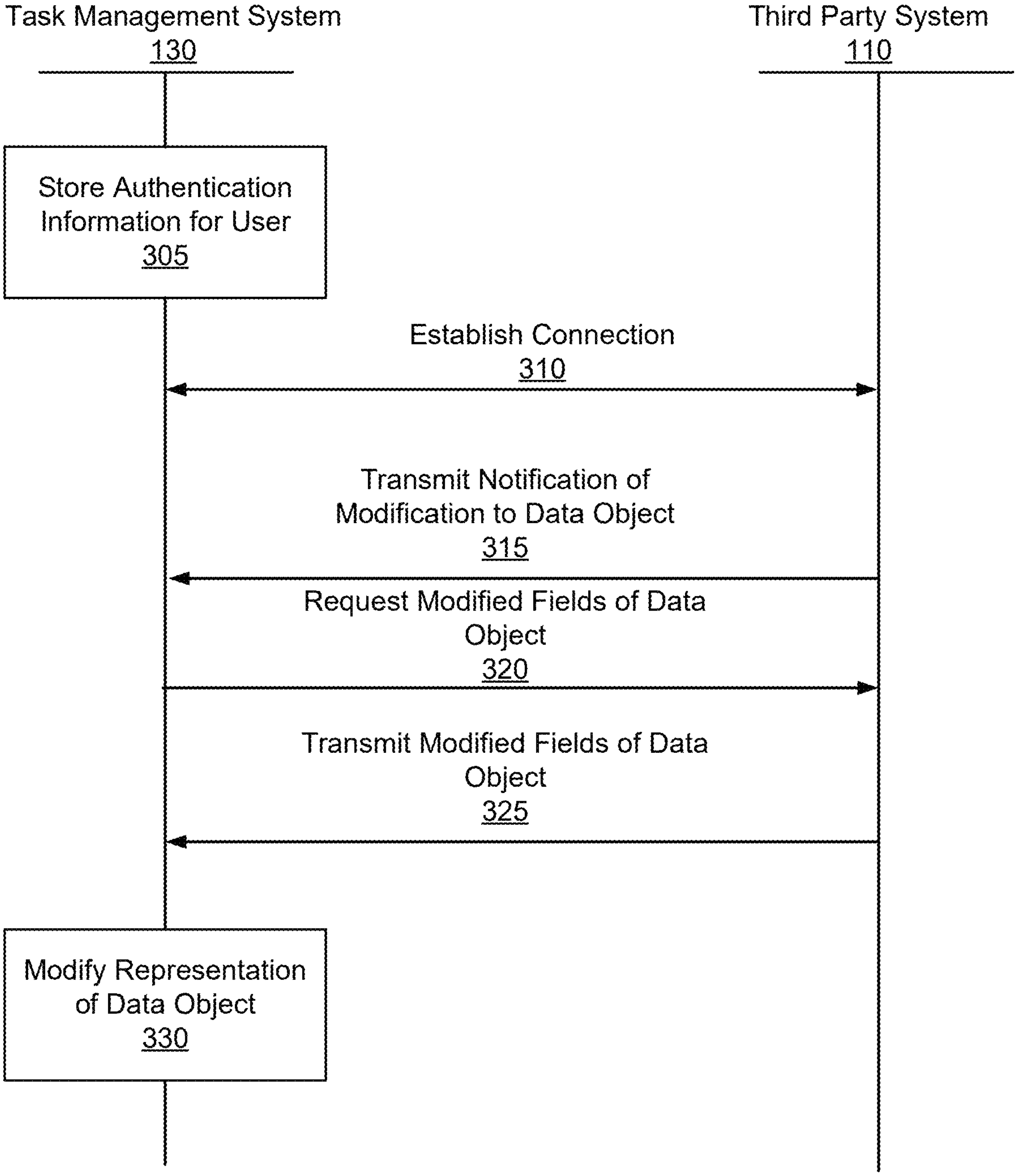
FIG. 3 illustrates an interaction diagram of a method for synchronizing modification to a data object across a third party system and a task management system, in accordance with one or more embodiments.

FIG. 3 is an interaction diagram of a method for synchronizing modification to a data object across a third party system 110 and a task management system 130, in accordance with some embodiments. Alternative embodiments may include more, fewer, or different steps from those illustrated in FIG. 3, and the steps may be performed in a different order from that illustrated in FIG. 3. These steps may be performed by the task management system 130, or by another online system, in various embodiments. Additionally, each of these steps may be performed automatically by the task management system 130 without human intervention.

To simplify retrieval and modification of data objects stored by a third party system 110, the task management system 130 obtains authentication information for the user to access the third party system 110, as further described above. In various embodiments, the authentication information comprises a token generated by the third party system 110 in response to a request from the user via the task management system 130. The task management system 130 receives the token from the third party system 110 and stores 305 the token as authentication information associated with the user and with the third party system 110. In some embodiments, the third party system 110 is associated with multiple applications providing different functionality for interacting with data stored by the third party system 110. In such embodiments, the third party system 110 receives a request to access stored data through a specific application from the task management system 130 and generates a token authorizing the third party system 110 to access the specific application on behalf of the user. The task management system 130 receives the token and stores 305 the received token as authentication information associated with the application and with the user. For example, the task management system 130 and the third party system 110 leverage the Open Authentication (OAuth) standard for delegating access to the third party system 110 for the task management system 130 to obtain authentication information for accessing the third party system 110 for the user. Different types of authentication information may be stored 305 by the task management system 130 in association with the user and with the third party system 110 in various embodiments. Example authentication information includes: a token, a combination of a username and a password, a cookie, or other type of information identifying the user to the third party system 110. As further described above in conjunction with FIG. 2, the task management system 130 may store permissions or other information associated with the authentication information, indicating types of interactions the user is authorized by the third party system 110 to perform.

After storing 305 the authentication information in association with the user and with the third party system 110. The task management system 130 establishes 310 a connection with the third party system 110 (or with an application associated with the third party system 110) using the authentication information stored 305 in association with the user and with the third party system 110. This leverages the authentication information associated with the user and with the third party system 110 to allow the task management system 130 to access data stored by the third party system 110 and accessible to the user. In some embodiments, a user or the third party system 110 specifies a type of connection between the task management system 130 and the third party system 110 to regulate access to data maintained by the third party system 110 and accessible to the user. The type of connection indicates whether other users of the third party system 110 may access data stored by the third party system 110 and accessible to the user via the connection in various embodiments. Additionally, the task management system 130 stores a connection status in association with authentication information associated with a user and a third party system 110. As further described above in conjunction with FIG. 2, the connection status indicates an indication of a capability the search module 220 to exchange data with the third party system 110 via the connection. The connection status may be periodically updated periodically updated by the third party system 110 or by the task management system 130 in various embodiments. The task management system 130 may prompt the user to provide authentication information or may transmit authentication information associated with the user and with the third party system 110 (or with an application associated with the third party system 110) in response to the connection status having a specific value, in some embodiments.

In response to the user modifying a data object stored by the third party system 110 using the third party system 110, the third party system 110 transmits 315 a notification of the modification of a data object using the third party system 110. In various embodiments, the notification includes an identifier of the data object that was modified, a type of modification to the data object, and an identifier of the data object used by the third party system 110. Additional information may be included in the notification in various embodiments. In some embodiments, the task management system 130 and the third party system 110 establish a webhook for an interaction corresponding to the modification of a data object via the third party system 110, so the third party system 110 transmits 315 the notification of the modification in response to the modification occurring. Different webhooks may be established for different modifications or for other interactions with data objects via the third party system 110 in various embodiments, allowing the third party system 110 to transmit 315 notifications of different modifications to a data object performed via the third party system 110 to the task management system 130. While using one or more webhooks cause the third party system 110 to transmit 315 the notification, where the third party system 110 pushes the notification, in other embodiments the task management system 130 transmits a request for one or more modifications to the data object including an identifier of the data object and the third party system 110 transmits 315 the notification via the connection in response to receiving the request.

In various embodiments, in response to receiving the notification, the task management system 130 requests 320 one or more fields of the data object identified by the notification that were modified. For example, the task management system 130 transmits a request including the identifier of the data object used by the third party system 110 and including an instruction to transmit data from one or more fields of the data object that were modified via the third party system 110 using the established connection. In response to receiving the request from the task management system 130, the third party system 110 transmits an identifier of one or more fields of the data object that were modified and information describing the modifications to each field. Information describing modification to a field of a data object may comprise the modified data stored in the field by the third party system 110. As another example, information describing modification to a field of a data object may be instructions that, when executed by the task management system, modify data in the field. Based on the received modified fields of the data object, the task management system 130 modifies 330 a representation of the data maintained by the task management system 130. For example, the task management system 130 identifies a field in the representation of the data object maintained by the task management system 130 for a field identified by the third party system 110 as modified and modifies 330 data in the identified field of the representation of the data object maintained by the task management system 130 based on the modifications performed at the third party system 110. This allows synchronization of fields of the data object maintained at the third party system 110 and fields of the data object maintained in the representation of the data object maintained by the task management system 130, providing consistency between copies of the data object maintained by the task management system and maintained by the third party system 110.

Figure 4:
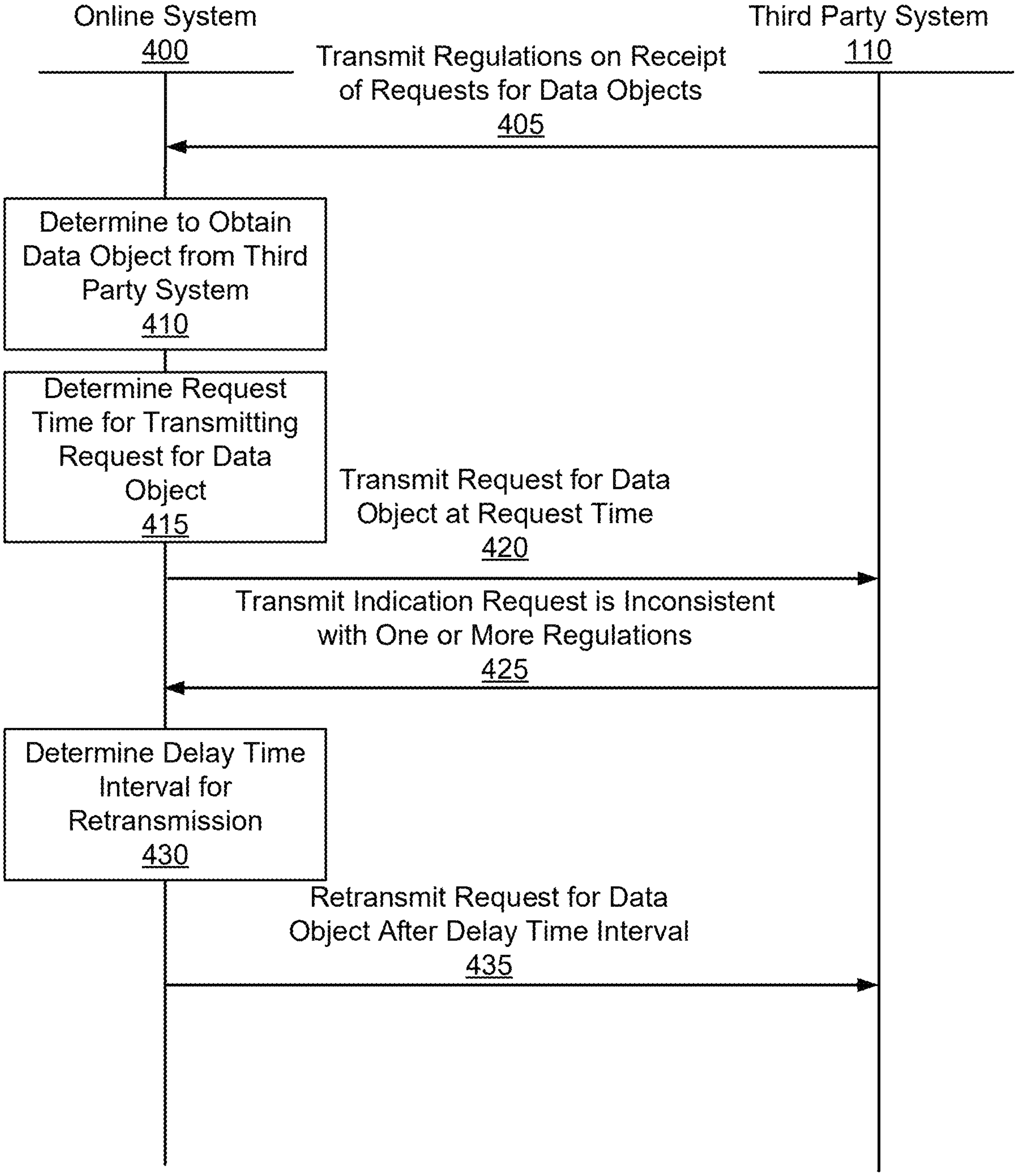
FIG. 4 illustrates an interaction diagram of a method for an online system scheduling transmission of requests for data objects to a third party system based on regulations enforced by the third party system, in accordance with one or more embodiments.

FIG. 4 is an interaction diagram of a method for an online system scheduling transmission of requests for data objects to a third party system 110 based on regulations enforced by the third party system 110. Alternative embodiments may include more, fewer, or different steps from those illustrated in FIG. 4, and the steps may be performed in a different order from that illustrated in FIG. 4. These steps may be performed by an online system, such as the task management system 130, in various embodiments. Additionally, each of these steps may be performed automatically by an online system, such as the task management system 130 without human intervention.

An online system 400, such as the task management system 130, further described above in conjunction with FIGS. 1 and 2, obtains and stores authentication information for the user to access a third party system 110. Examples of authentication information include: a token, a cookie, a combination of a username and a password, or other information uniquely identifying the user to the third party system 110. Using the authentication information, the online system 400 establishes a connection with the third party system 110 on behalf of the user. Because the online system 400 uses authentication information specific to the user to establish a connection to the third party system 110, the third party system 110 provides the online system 400 with access to data objects the third party system 110 maintains and associates with the user. The authentication information for the user access to data objects via the established connection to data objects maintained by the third party system 110 and associated with the user, while preventing access to data objects maintained by the third party system 110 that are not associated with the user via the connection, as further described above in conjunction with FIG. 2.

To simplify subsequent access to data objects maintained by the third party system 110 for a user through the online system 400, the online system 400 indexes data objects stored by the third party system 110 for the user. Such an index maintains a copy of the data objects stored by the third party system 110 for the user at the online system 400, simplifying subsequent retrieval of the data objects through the online system 400. Indexing data objects maintained by the third party system 110 for the user enables the user to subsequently access those data objects through the online system 400, simplifying access to data objects stored by the third party system 110 by the user interacting with the online system 400. For example, maintaining an index of data objects stored by the third party system 110 allows the online system 400 to more efficiently evaluate the data objects against one or more search queries received from the user. In various embodiments, the online system 400 and the third party system 110 exchange data objects stored by the third party system 110 and accessible to the user through a representational state transfer (REST) framework, where data objects are identified in requests between the online system 400 and the third party system 110 via the connection as universal resource indicators (URIs) transmitted via the connection.

The online system 400 transmits multiple requests for data objects to the third party system 110 via a network 120 to generate and to maintain an index of data objects maintained by the third party system 110 for the user. For example, the online system 400 receives a data object maintained by the third party system 110 to be locally stored or receives one or more modifications to the data object made by the third party system 110 in response to a request. As further described above in conjunction with FIG. 2, the online system 400, such as the task management system 130, subsequently locally stores copies of the data objects received from the third party system 110 in response to a request or modifies a locally stored copy of a data object for which the third party system 110 transmits one or more modifications in response to the request. This allows the index maintained by the online system 140 to accurately replicate data objects the third party system 110 maintains for a user and to accurately reflect modifications to the data objects by the third party system 110.

However, the third party system 110 enforces one or more regulations on receipt of requests for data objects. The one or more regulations limit a rate at which the third party system 110 receives requests for data objects received from various sources, such as the online system 400. Such regulations prevent resources of the third party system 110 being overloaded in response to received requests and allow the third party system 110 to distribute resources across various users accessing data objects maintained by the third party system 110 to optimize data object retrieval time for various users. In various embodiments, the third party system 110 transmits 405 the one or more regulations on receipt of requests for data objects to the online system 400. Receiving the one or more regulations on receipt of requests for data objects allows the online system 400 to schedule transmission of requests for data objects to the third party system 110. One or more regulations on receipt of requests for data objects may be global regulations based on requests from multiple users or may be user-specific based on requests received from a specific user. The third party system 110 may enforce global regulations on receipt of requests for data objects that account for requests received from multiple users as well as user-specific regulations on receipt of requests for data objects from a specific user in various embodiments.

Based on the one or more regulations on receipt of requests for data objects, the online system 400 schedules transmission of requests for data objects to the third party system 110. For example, the third party system 110 imposes a limit on a number of requests for data objects received during a time interval to no more than a threshold number of requests within a time interval. As an example, the third party system 110 specifies a threshold number of requests for data objects received during an hour. The third party system 110 transmits the threshold number of requests and the time interval for the threshold number of requests to the online system 400 to allow the online system 400 to schedule transmission of requests for data objects.

As another example, the third party system 110 implements a token bucket scheduling process where requests are added to a bucket at a specific and fixed rate. The bucket includes a maximum number of requests, and requests received when the bucket includes the maximum number of requests are discarded. When the bucket includes at least a specific number of requests, the specific number of requests are transmitted to the third party system 110. For the online system 400 to schedule transmission of requests, the third party system 110 transmits 405 the maximum number of requests in a bucket, the rate for adding requests to the bucket, and the specific number of requests to the online system 400. As another example, the third party system 110 differently weights different requests for data objects based on attributes of the requests, providing for different regulations on requests having different attributes. For example, different requests for data objects identify different actions to perform on a data object (e.g., retrieve a data object, modify a data object, etc.), and the third party system 110 differently regulates receipt of different types of requests. The third party system 110 transmits information identifying different types of requests and regulations on receipt of different types of requests (e.g., a threshold number of requests having a particular type received within a time interval, etc.).

In various embodiments, the online system 400 comprises a distributed system distributed system including multiple servers that communicate with each other via the network 120. Different users of the online system 400 may access different servers of the online system 400, and different servers of the online system 400 may perform different functions for the online system 400. In such a distributed system, multiple servers comprising the online system 400 may transmit requests for data objects to the third party system 110. Having multiple servers transmit requests for data objects increases a likelihood of the online system 400 reaching or exceeding a restriction on a number of requests for data objects or on a frequency of requests for data objects received by the third party system 110. For example, when ingesting data objects to index for different users, as further described above in conjunction with FIG. 2, multiple servers of the online system 400 transmit multiple requests to the third party system 110, with the volume of requests for data objects from the various servers of the online system 400 equaling or exceeding one or more regulations on receipt of requests for data objects enforced by the third party system 110. As another example, a particular server of the online system 400 transmits a large number of requests for data objects when ingesting data objects for particular user, so requests for data objects from other servers of the online system 400 may be limited in transmitting requests for data objects to the third party system 110 by one or more restrictions enforced by the third party system 110. Equaling or exceeding a regulation on receipt of requests for data objects causes the online system 400 to retransmit one or more requests for data objects to the third party system 110 at later times, delaying receipt of data objects from the third party system 110 by the online system 400. Additionally, retransmitting requests for data objects increases an amount of network bandwidth used by the online system 400 and by the third party system 110 for a longer amount of time, slowing exchange of other data between the third party system 110 and the online system 400.

To reduce a likelihood of retransmitting a request for a data object from the online system 400 to the third party system 110, when the online system 140 determines 410 to obtain a data object from the third party system 110, the online system 400 determines 415 a request time for transmitting the request for the data object to the third party system 110. The data object is associated with a user of the third party system 110 who has authorized the online system 400 to access data objects the third party system 110 maintains for the user. For example, the online system 140 determines 410 to obtain a data object from the third party system 110 in response to receiving an input from the user to access the data object. As another example, the online system 140 determines 410 to obtain the data object from the third party system 110 in response to one or more criteria being satisfied (e.g., a threshold amount of time elapsing from transmission of a prior request for a data object, receiving an indication from the third party system 110 that a data object maintained by the third party system 110 has been modified). The request time is later than a time when the online system 400 determined 415 to obtain the data object, so the online system 400 schedules transmission of the request for the data object to the third party system 110 at a time in the future, rather than transmitting the request when the online system 400 determines 410 to obtain the data object from the third party system 110.

When determining 420 the request time for transmitting the request for the data object to the third party system 110, the online system 400 accounts for one or more of the regulations on receipt of requests for data objects enforced by the third party system 110 and prior requests for data objects previously transmitted to the third party system 110 by the online system 400. In various embodiments, the online system 400 determines a prior number of requests for data objects previously transmitted to the third party system 110 during a specific time interval and evaluates the prior number of requests for data objects against one or more regulations on receipt of requests for data objects. For example, a regulation enforced by the third party system 110 specifies a threshold number of requests for data objects received during a time interval, and the online system 400 determines whether a number of prior requests for data objects transmitted to the third party system 110 is less than the threshold for the time interval. In response to the number of additional requests for data objects for the online system 400 to transmit and the received request not exceeding the threshold at the request time, the online system 440 determines 415 the request time as a time within the time interval However, in response to determining the number of additional requests for data objects and the received request exceeds the threshold, the online system 400 determines 415 the request time for a time later than the time interval. For example, the online system 400 determines 415 a total number of requests for data objects previously transmitted from the online system 400 to the third party system 110 during a time interval equals a threshold value, the online system 400 determines 415 the request time as a time later than the time interval. The request time may be based on a number of previously transmitted requests from the online system 400 to the third party system 110 during the time interval in some embodiments. In other embodiments, a regulation enforced by the third party system 110 is a token bucket scheduling process adding requests to a bucket at a specific and fixed rate, as further described above. The online system 400 determines whether to include the request to obtain the data object in a current bucket or to delay the request for inclusion in a subsequent bucket after the current bucket is transmitted based on a number of requests included in the bucket.

When determining 415 the request time, the online system 400 accounts for a prior number of requests for data objects associated with the user associated with the request to obtain the data object. In various embodiments, a third party system 110 enforces one or more user-specific regulations on receipt of requests for data objects, so accounting for prior requests for data objects associated with a user for whom the data object is obtained determines when the online system 400 determines 415 the request time for transmitting the request subject to the regulations on receipt of requests for data objects enforced by the third party system 110. As further described above in conjunction with FIG. 2, the online system 400 maintains authentication information for the third party system 110 specific to the user and establishes a connection to the third party system 110 for obtaining data objects associated with the user by the third party system 110 via the authentication information for the third party system 110 specific to the user. When determining 415 the request time for transmitting the request for the data object to the third party system 110, the online system determines 415 the request time based in part on one or more prior requests for data objects transmitted to the third party system 110 using the authentication information for the third party system 110 specific to the user. For example, the online system 400 determines 415 the request time for transmitting the request for the data object so a number of requests for data objects transmitted to the third party system 110 using authentication information specific to the user does not exceed a threshold amount during a specific time interval, or otherwise complies with user-specific regulations on requests for data objects the third party system 110 receives using authentication information for the third party system 110 specific to the user. Hence, the online system 400 determines 415 the request time for transmitting the request for the data object to the third party system 110 based on prior requests for data objects transmitted to the third party system 110 using the authentication information for the third party system 110 specific to the user and based on prior requests for data objects transmitted to the third party system 110 by the online system 400 for various users in some embodiments. For example, in response to determining a number of requests for data objects to transmit to the third party system 110 using authentication information for the third party system 110 specific to the user equals a threshold amount during a specific time interval, the online system 400 determines 415 the request time for transmitting the request for the data object using authentication information for the third party system 110 specific to the user as a subsequent time. The subsequent time may be based on a number of previously transmitted requests for data objects to the third party system 110 using the authentication information for the third party system 110 specific to the user equals a threshold amount during the specific time interval.

At the request time, the online system 400 transmits 420 the request for the data object to the third party system 110 via the network 120. In response to the request for the data object being consistent with the regulations on receipt of requests for data objects enforced by the third party system 110, the third party system 110 transmits the data object identified by the request to the online system 140 via the network 120. Hence, when the request is consistent with regulations on receipt of requests enforced by the third party system 110, the third party system 110 responds to the request by transmitting the data object identified by the request to the online system 400.

However, in response to the third party system 110 determining the request for the data object is not consistent with at least one regulation on receipt of requests for data objects, the third party system 110 transmits 425 an indication to the online system 400 that the request is inconsistent with at least one regulation on receipt on requests for data objects. For example, the third party system 110 transmits 425 the indication to the online system 400 in response to the third party system 110 receiving greater than a threshold number of requests in a specific time interval that includes the request time. As another example, the third party system 110 transmits 425 the indication to the online system 400 in response to the third party system 110 received greater than a threshold number of requests for data objects associated with authentication information for the user in a specific time interval that includes the request time. In other embodiments, the third party system 110 transmits 425 the indication in response to determining that the request for the data object is not consistent with one or more other regulations enforced by the third party system 110. The request not being consistent with at least one regulation enforced by the third party system 110 indicates the third party system 110 received greater than a threshold number of requests in a time interval, which impairs performance of the third party system 110.

The third party system 110 transmits 425 the indication rather than the data object identified by the request in response to determining the request for the data object is not consistent with one or more regulations enforced by the third party system 110. In response to receiving the indication, the online system 400 determines 430 a delay time interval for retransmitting the request for the data object to the third party system 110. The delay time interval exponentially increases based on a number of indications that the request was inconsistent with one or more regulations the third party system 110 enforces that the online system 400 received from the third party system 110. For example, the online system 400 determines an exponent for a base value for determining 430 the delay time interval based on a number of indications that requests from the online system 400 for data objects were inconsistent with one or more regulations on receipt of requests for data objects enforced by the third party system 110 the online system 400 received from the third party system 110. In various embodiments, the determined exponent comprises a number of number of indications that requests from the online system 400 for data objects were inconsistent with one or more regulations on receipt of requests for data objects enforced by the third party system 110 the online system 400 received from the third party system 110. For example, the base value is two, while in other embodiments, the base value is another numerical value. The online system 400 raises the base value to the determined exponent to determine 430 the delay time interval. In various embodiments, the online system 400 multiplies a time interval by the base value raised to the determined exponent to determine 430 the delay time interval. For example, the online system 400 maintains a predetermined value for the time interval. In some embodiments, the online system 400 maintains different time intervals for different third party systems 110. In such embodiments, the online system 400 retrieves a time interval associated with an identifier of the third party system 110 and multiples the retrieved time interval by a coefficient comprising the base value raised to an exponent comprising the number of indications received from the third party system 110 to determine 430 the delay time interval. Hence, the online system multiplies a time interval by a coefficient comprising the base value raised to the determined exponent to determine the delay time interval. Hence, as a number of indications the online system 400 receives from the third party system 110 increases, the delay time interval for retransmitting the request exponentially increases to increase an amount of time before retransmission.

After waiting the determined delay time interval from receipt of the indication, the online system 400 subsequently retransmits 435 the request for the data object to the third party system 110. In response to the retransmitted request for the data object being consistent with the regulations on receipt of requests for data objects enforced by the third party system 110, the third party system 110 transmits the data object to the online system 140 via the network 120, as further described above. However, in response to the third party system 110 determining the retransmitted request for the data object is not consistent with at least one regulation on receipt of requests for data objects, the third party system 110 transmits an additional indication to the online system 400 that the retransmitted request is inconsistent with at least one regulation on receipt on requests for data objects, as further described above.

In response to receiving the additional indication from the third party system 110, the online system 400 updates the delay time interval based on the additional indication, as further described above. For example, the online system 400 increments an exponent used to determine the delay time interval in response to receiving the additional indication. Based on the incremented exponent, the online system 400 determines 430 the updated delay time interval, as further described above. After waiting the updated delay time interval, the online system 400 retransmits 435 the request for the data object to the third party system 110. Hence, the online system 400 iteratively increases the delay time interval for retransmitting the request for the data object as a number of indications the request is inconsistent with one or more regulations enforced by the third party system 110 received by the online system 400 increases.

Determining the delay time interval as an exponentially increasing value based on a number of indications received from the third party system 110 allows the online system 400 to iteratively increase the delay time interval between successive retransmissions of the request. As different third party systems 110 often maintain different regulations on receipt of requests for data object, dynamically modifying the delay interval for retransmitting a request for the data object in response to an indication received from the third party system 110 in response to a request allows the online system 400 to accommodate different regulations on receipt of requests for data objects without maintaining and applying multiple different methods for determining delay intervals for retransmitting requests for data objects for different third party systems 110. This reduces computational resources used by the online system 400 to schedule retransmission of a request for a data object by providing a consistent process for determining a delay time interval for retransmitting requests for data objects suitable for use with various third party systems 130.

As the method described in conjunction with FIG. 4 exponentially increases the delay time interval for retransmitting a request for a data object to a third party system 110 in response to receiving one or more indications the request is inconsistent with one or more regulations on receipt of requests for data objects enforced by the third party system 110, determination of the delay time interval rapidly converges to various regulations for receiving requests for data objects. This decreases a number of retransmissions of a request for a data object from the online system 400 to a third party system 110, which also reduces a number of indications that the request is inconsistent with one or more regulations transmitted by the third party system 110. This reduction in retransmissions of the request conserves network bandwidth and decreases an amount of time for the online system 400 to receive the data object from the third party system 110.

Figure 5:
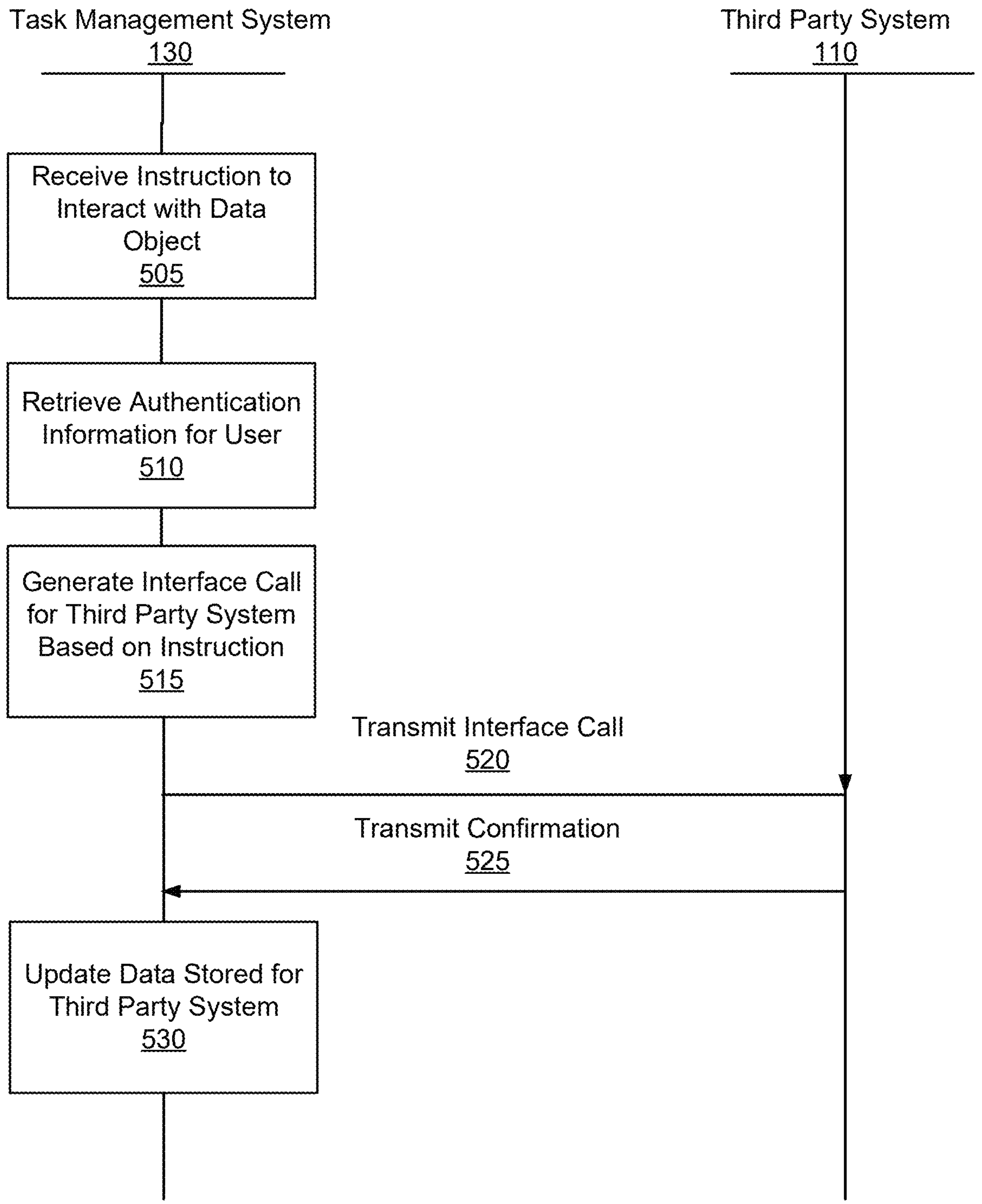
FIG. 5 illustrates an interaction diagram of a method for a task management system transmitting an interface call to a third party system in response to an instruction to interacting with data stored by the third party system from a user, in accordance with one or more embodiments.

FIG. 5 is an interaction diagram of a method for a task management system 130 transmitting an interface call to a third party system 110 in response to an instruction to interacting with data stored by the third party system 110 from a user. Alternative embodiments may include more, fewer, or different steps from those illustrated in FIG. 5, and the steps may be performed in a different order from that illustrated in FIG. 5. These steps may be performed by the task management system 130, or by another online system, in various embodiments. Additionally, each of these steps may be performed automatically by the task management system 130 without human intervention.

To allow a user to retrieve or to otherwise interact with data objects stored by a third party system 110 through interaction with the task management system 130, the task management system 130 stores authentication information associated with the user and with the third party system 110 and establishes a connection between the task management system 130 and the third party system 110 using the authentication information, as further described above in conjunction with FIGS. 2 and 3. In various embodiments, the task management system 130 generates a graph representing data stored by the third party system 110 and accessible to the user using the connection, with data objects stored by the third party system 110 normalized into a common representation maintained by the task management system 130 to simplify subsequent access, as further described above in conjunction with FIG. 2. The representation of data stored by the third party system 110 allows the task management system 130 to more efficiently retrieve data objects stored by the third party system 110 for a user to interact with.

Subsequently, the task management system 130 receives 505 an instruction from the user to interact with a data object stored by the third party system 110 and accessible to the user. Example instructions include a request to open a data object stored by the third party system 110, a request to close a data object stored by the third party system 110, a request for one or more attributes of a data object, a request to update a field of a data object, a request for a preview of a data object, a request to create a data object, a request to delete a data object, or other interaction with data stored by the third party system 110 and accessible to the user. The task management system 130 retrieves 510 stored authentication information for the user for the third party system 110 and generates 515 an interface call for the third party system 110 based on the received instruction. In various embodiments, the instruction received 505 by the task management system 130 has a first format corresponding to the task management system 130, and the task management system 130 generates 515 the interface call for the third party system 110 in an alternative format corresponding to the third party system 110. In various embodiments, the task management system 130 maintains mappings between the first format corresponding to the task management system 130 and alternative formats, with different alternative formats corresponding to different third party systems 110 (or to different applications). Alternatively, the task management system 130 maintains one or more trained models corresponding to different third party systems 110. A trained model receives the instruction in the first format as an input and generates 515 an interface call for a corresponding third party system 110 (or application) having the alternative format associated with the corresponding third party system 110 (or application). This allows the user to provide an instruction for interacting with a data object stored by the third party system 110 in a format associated with the third party system 110, which the task management system 130 converts into an instruction having a corresponding format used by the third party system 110, simplifying interaction with data objects stored by the third party system 110 for the user by allowing the user to provide instructions for interacting with data objects stored by different third party systems 130 in the first format, and the task management system 130 generates instructions corresponding formats specific to different third party systems 110 based on the received instruction.

The task management system 130 transmits 520 the interface call in the alternative format associated with the third party system 110 to the third party system 110 via the established connection to the third party system 110. Based on the received interface call, the task management system 130 performs the interaction with the data object identified by the received interface call. After performing the interaction with the data object, the third party system 110 transmits 525 a confirmation to the task management system 130 that the interaction was performed with the data object based on the instruction the task management system 130 received 505 from the user. In response to receiving the confirmation, the task management system 130 updates 530 the representation of the data object corresponding to the instruction, so the representation of the data object is consistent with the data object maintained by the third party system 110 after performing the interaction identified by the instruction. Updating the representation of the data object identified by the instruction after receiving the confirmation from the third party system 110 that the interaction was performed maintains consistency between the data object stored by the third party system 110 and the representation of the data object maintained by the task management system 130.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

obtaining, by an online system, one or more regulations on receipt of requests for data objects enforced by a third party system;

determining, by the online system, to obtain a data object from the third party system, the data object associated with a user of the third party system;

determining a request time for transmitting a request for the data object from the online system to the third party system based on the one or more regulations on receipt of requests for data objects enforced by the third party system, the request time later than a time when the online system determines to obtain the data object from the third party system;

transmitting the request for the data object from the online system to the third party system at the request time;

in response to receiving an indication from the third party system that the request for the data object is inconsistent with a regulation of receipt of requests for data objects, determining a delay time interval before retransmitting the request to the third party system, the delay time interval exponentially increasing based on a number of indications received from the third party system that requests from the online system for data object are inconsistent with one or more regulations on receipt of requests for data objects enforced by the third party system; and retransmitting the request for the data object from the online system to the third party system after waiting the delay time interval.

2. The method of claim 1, wherein determining the delay time interval before retransmitting the request to the third party system comprises:

determining the delay time interval as a product of a time interval and a coefficient comprising a base value raised to an exponent based on the number of indications received from the third party system that requests from the online system for data object are inconsistent with one or more regulations on receipt of requests for data objects enforced by the third party system.

3. The method of claim 2, wherein determining the delay time interval before retransmitting the request to the third party system comprises:

increasing the exponent of the base value used to determine the delay time interval in response to receiving the indication from the third party system.

4. The method of claim 2, wherein determining the delay time interval before retransmitting the request to the third party system comprises:

retrieving a time interval associated with the third party system by the online system; and determining the delay time interval as a product of the retrieved time interval and the coefficient.

5. The method of claim 1, further comprising:

receiving an additional indication from the third party system that the retransmitted request for the data object is inconsistent with the regulation of receipt of requests for data objects; and in response to receiving the additional indication from the third party system that the retransmitted request for the data object is inconsistent with the regulation of receipt of requests for data objects, updating the delay time interval before retransmitting the request to the third party system by incrementing an exponent of a base value used to determine the delay time interval in response to receiving the additional indication.

6. The method of claim 5, further comprising:

retransmitting the request for the data object from the online system to the third party system after waiting the updated delay time interval.

7. The method of claim 1, wherein determining the request time for transmitting the request for the data object from the online system to the third party system based on the one or more regulations on receipt of requests for data objects enforced by the third party system comprises:

determining a number of prior requests for data objects the online system transmitted to the third party system during a specific time interval; and determining the request time based on the number of prior requests, the request for the data object, and the one or more regulations on receipt of requests for data object enforced by the third party system.

8. The method of claim 1, wherein determining the request time for transmitting the request for the data object from the online system to the third party system based on the one or more regulations on receipt of requests for data objects enforced by the third party system comprises:

determining a number of prior requests for data objects associated with the user that the online system transmitted to the third party system during a specific time interval; and determining the request time based on the number of prior requests for data objects associated with the user, the request for the data object, and the one or more regulations on receipt of requests for data object enforced by the third party system.

9. The method of claim 1, wherein receiving the indication from the third party system that the request for the data object is inconsistent with the regulation of receipt of requests for data objects comprises:

receiving the indication in response to the third party system determining greater than a threshold number of requests for data objects associated with the user were received by the third party system in a time interval.

10. A computer program product comprising a non-transitory computer readable storage medium having instructions encoded thereon that, when executed by a processor, cause the processor to perform steps comprising:

obtaining, by an online system, one or more regulations on receipt of requests for data objects enforced by a third party system;

determining, by the online system, to obtain a data object from the third party system, the data object associated with a user of the third party system;

determining a request time for transmitting a request for the data object from the online system to the third party system based on the one or more regulations on receipt of requests for data objects enforced by the third party system, the request time later than a time when the online system determines to obtain the data object from the third party system;

transmitting the request for the data object from the online system to the third party system at the request time;

in response to receiving an indication from the third party system that the request for the data object is inconsistent with a regulation of receipt of requests for data objects, determining a delay time interval before retransmitting the request to the third party system, the delay time interval exponentially increasing based on a number of indications received from the third party system that requests from the online system for data object are inconsistent with one or more regulations on receipt of requests for data objects enforced by the third party system; and retransmitting the request for the data object from the online system to the third party system after waiting the delay time interval.

11. The computer program product of claim 10, wherein determining the delay time interval before retransmitting the request to the third party system comprises:

determining the delay time interval as a product of a time interval and a coefficient comprising a base value raised to an exponent based on the number of indications received from the third party system that requests from the online system for data object are inconsistent with one or more regulations on receipt of requests for data objects enforced by the third party system.

12. The computer program product of claim 11, wherein determining the delay time interval before retransmitting the request to the third party system comprises:

increasing the exponent of the base value used to determine the delay time interval in response to receiving the indication from the third party system.

13. The computer program product of claim 11, wherein determining the delay time interval before retransmitting the request to the third party system comprises:

retrieving a time interval associated with the third party system by the online system; and determining the delay time interval as a product of the retrieved time interval and the coefficient.

14. The computer program product of claim 10, wherein the non-transitory computer readable storage medium further has instructions encoded thereon that, when executed by the processor, cause the processor to perform steps comprising:

receiving an additional indication from the third party system that the retransmitted request for the data object is inconsistent with the regulation of receipt of requests for data objects; and in response to receiving the additional indication from the third party system that the retransmitted request for the data object is inconsistent with the regulation of receipt of requests for data objects, updating the delay time interval before retransmitting the request to the third party system by incrementing an exponent of a base value used to determine the delay time interval in response to receiving the additional indication.

15. The computer program product of claim 14, wherein the non-transitory computer readable storage medium further has instructions encoded thereon that, when executed by the processor, cause the processor to perform steps comprising:

retransmitting the request for the data object from the online system to the third party system after waiting the updated delay time interval.

16. The computer program product of claim 10, wherein determining the request time for transmitting the request for the data object from the online system to the third party system based on the one or more regulations on receipt of requests for data objects enforced by the third party system comprises:

determining a number of prior requests for data objects the online system transmitted to the third party system during a specific time interval; and determining the request time based on the number of prior requests, the request for the data object, and the one or more regulations on receipt of requests for data object enforced by the third party system.

17. The computer program product of claim 10, wherein determining the request time for transmitting the request for the data object from the online system to the third party system based on the one or more regulations on receipt of requests for data objects enforced by the third party system comprises:

determining a number of prior requests for data objects associated with the user that the online system transmitted to the third party system during a specific time interval; and determining the request time based on the number of prior requests for data objects associated with the user, the request for the data object, and the one or more regulations on receipt of requests for data object enforced by the third party system.

18. The computer program product of claim 10, wherein receiving the indication from the third party system that the request for the data object is inconsistent with the regulation of receipt of requests for data objects comprises:

receiving the indication in response to the third party system determining greater than a threshold number of requests for data objects associated with the user were received by the third party system in a time interval.

* * * * *